United States Patent
Onozuka et al.

(10) Patent No.: US 7,589,454 B2
(45) Date of Patent: Sep. 15, 2009

(54) DRIVING APPARATUS

(75) Inventors: Haruo Onozuka, Saitama (JP); Tatsuo Saito, Saitama (JP); Katsuji Ozawa, Saitama (JP); Yukio Okazaki, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 73 days.

(21) Appl. No.: 11/783,545

(22) Filed: Apr. 10, 2007

(65) Prior Publication Data

US 2007/0236101 A1 Oct. 11, 2007

(30) Foreign Application Priority Data

Apr. 11, 2006 (JP) ............................. P2006-108819

(51) Int. Cl.
*H01L 41/08* (2006.01)
(52) U.S. Cl. ..................................................... 310/317
(58) Field of Classification Search ................. 310/317, 310/323.17, 323.21; 333/187–195
See application file for complete search history.

(56) References Cited

U.S. PATENT DOCUMENTS

| | | | |
|---|---|---|---|
| 5,917,267 A * | 6/1999 | Miyazawa et al. .......... | 310/317 |
| 6,194,811 B1 * | 2/2001 | Shinke et al. ........... | 310/323.17 |
| 6,232,697 B1 * | 5/2001 | Mizumoto .................. | 310/317 |
| 6,545,389 B1 * | 4/2003 | Yoshida ....................... | 310/317 |
| 7,102,270 B2 * | 9/2006 | Ito et al. ..................... | 310/317 |
| 7,271,522 B2 * | 9/2007 | Yuasa et al. ................. | 310/317 |
| 7,315,108 B2 * | 1/2008 | Okamoto et al. ........ | 310/323.17 |
| 7,372,190 B2 * | 5/2008 | Manabe ...................... | 310/328 |
| 7,432,636 B2 * | 10/2008 | Ito et al. ..................... | 310/328 |
| 2009/0001852 A1 * | 1/2009 | Ashizawa ............... | 310/323.16 |

FOREIGN PATENT DOCUMENTS

| | | |
|---|---|---|
| JP | 9-191676 A | 7/1997 |
| JP | 10-337056 A | 12/1998 |
| JP | 11-155292 A | 6/1999 |
| JP | 2001-86778 A | 3/2001 |
| JP | 3358418 B2 | 10/2002 |
| JP | 2003-189644 A | 7/2003 |

* cited by examiner

*Primary Examiner*—Jaydi SanMartin
(74) *Attorney, Agent, or Firm*—Birch, Stewart, Kolasch & Birch, LLP (57) ABSTRACT

A driving apparatus comprises: an electro-mechanical conversion element; a driving member that drives backwards and forwards in a straight line in response to extension and contraction of the electro-mechanical conversion element which are brought about by a drive signal being supplied thereto; a driven member, frictionally engaged with the driving member, that moves backwards and forwards in a straight line along the driving member by driving the driving member; and a drive control unit that divides a whole traveling area of one or both of an outgoing traveling path and an incoming traveling path of the driven member into a plurality of divided areas and supplies different drive signals to the divided areas so as to implement a drive control.

8 Claims, 11 Drawing Sheets

DRIVING APPARATUS

BACKGROUND OF THE INVENTION

1. Field of the Invention

The present invention relates to a driving apparatus which utilizes an electro-mechanical conversion element such as a piezoelectric element, and more particularly to a driving apparatus for driving an optical member such as a small lens which is installed on a small digital camera, a web camera or a mobile phone with a camera.

2. Description of the Related Art

As the related-art lens driving apparatus which utilizes a piezoelectric element, as is described in the Japanese Patent No. 3358418, there is known a driving apparatus in which a driving member is secured to a piezoelectric element, and a driven member is brought into frictional engagement with the driving member, whereby drive pulses are inputted into the piezoelectric element so as to cause the element to extend and contract to thereby move the driving member backwards and forwards in a straight line, so that the driven member is caused to move relative to the driving member.

This driving apparatus is such as to reduce effects imposed by impact noise produced when the driven member is drastically moved, stopped and reversed by controlling a drive pulse impressing time or drive pulse voltage to change gradually, so that the driving speed changes gradually. For example, when the driving apparatus is started to operate, the traveling speed of the driven member is made to be monitored via information from a detection unit, and in the event that the traveling speed is less than or equal to a constant speed, a drive signal pattern is supplied which increases the speed gradually. Then, when the traveling speed of the driven member reaches the constant speed, the drive signal pattern is switched to a constant drive signal pattern.

Figure 11:
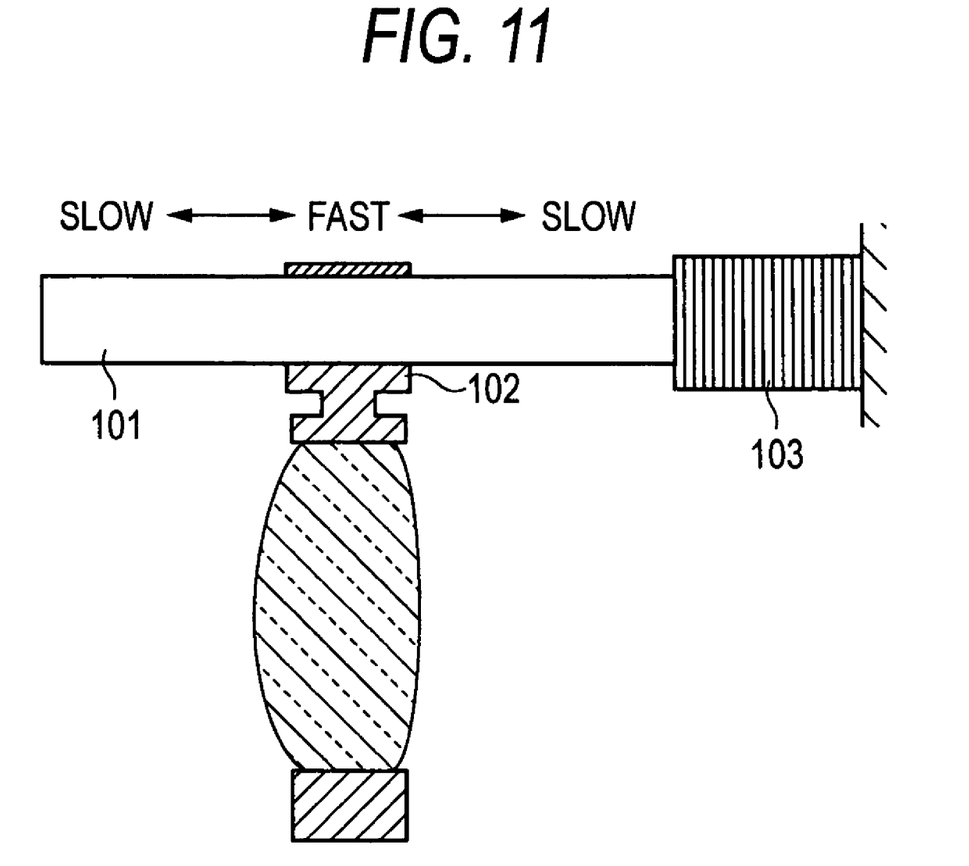
FIG. 11 is an explanatory diagram which explains the related art.

However, a driving apparatus like this has a problem that the control of traveling of the driven member is difficult. As shown in FIG. 11, even in the event that the same constant drive signal is imputed into a piezoelectric element 103, there may occur a case where the traveling distance of a driven member 102 differs depending upon the position of the driven member 102 relative to a driving member 101. For example, the driven member 102 travels fast in a central position of the driving member 101, while the traveling of the driven member 102 is delayed in positions lying in end portions of the driving member 101. In this case, since the traveling speed of the driven member 102 changes depending upon the position thereof, the control of traveling of the driven member 102 becomes difficult. In addition, there may occur a case where the traveling speed of the driven member 102 changes depending upon the traveling direction thereof, and in order to control the traveling of the driven member 102 accurately, the traveling of the driven member 102 needs to be desirably controlled in consideration of the change in the traveling speed.

SUMMARY OF THE INVENTION

The invention was made with a view to solving the technical problem inherent in the related art, and an object thereof is to provide a driving apparatus which can suppress the change in traveling speed of the driven member.

Namely, according to the invention, there is provided a driving apparatus comprising: an electro-mechanical conversion element; a driving member that drives backwards and forwards in a straight line in response to extension and contraction of the electro-mechanical conversion element which are brought about by a drive signal being supplied thereto; a driven member, frictionally engaged with the driving member, that moves backwards and forwards in a straight line along the driving member by driving the driving member; and a drive control section that divides a whole traveling area of one or both of an outgoing traveling path and an incoming traveling path of the driven member into a plurality of divided areas and supplies different drive signals to the divided areas so as to implement a drive control.

According to this aspect of the invention, by implementing the drive control by supplying different drive signals to the divided areas of one or both of the outgoing traveling path and the incoming traveling path of the driven member, even in the event that the traveling speed of the driven member changes depending on the position thereof relative to the driving member when the driving member is driven by the same drive signal, the change in traveling speed of the driven member can be suppressed.

In addition, in the driving apparatus according to the invention, the drive control unit preferably supplies a drive signal to the electro-mechanical conversion element so that a driving speed of the driving member becomes larger in a position lying at an end portion side than a position lying on a center side of the driving member.

According to this aspect of the invention, the drive signal is supplied to the electro-mechanical conversion element so that the driving speed of the driving member becomes larger in the position lying at the end portion side than the position lying on the center side of the driving member. Because of this, even in the event that the traveling speed of the driven member becomes small in the position lying on the end portion side of the driving member when the driving member is driven at the same driving speed, the reduction in traveling speed of the driven member can be suppressed.

In addition, in the driving apparatus according to the invention, the different drive signals are preferably such that their signal frequencies are changed. Additionally, in the driving apparatus according to the invention, the different drive signals are preferably such that their waveforms are changed.

According to the invention, there is provided a driving apparatus comprising: an electro-mechanical conversion element; a driving member that drives backwards and forwards in a straight line in response to extension and contraction of the electro-mechanical conversion element which are brought about by a drive signal being supplied thereto; a driven member, frictionally engaged with the driving member, that moves backwards and forwards in a straight line along the driving member by driving the driving member; and a drive control unit that controls a driving speed of the driving member by supplying different drive signals according to traveling directions of the driven member. Note that when used here, the "different drive signals" mean signals which make the driving speed of the driving member differ.

According to this aspect of the invention, by controlling the driving speed of the driving member by supplying the different drive signals according to traveling directions of the driven member, even in the event that the traveling speed of the driven member changes depending upon the traveling directions thereof when the driving member is driven by the same driving signal, the change in traveling speed of the driven member can be suppressed.

In addition, in the driving apparatus according to the invention, the drive control unit preferably supplies a drive signal to the electro-mechanical conversion element so that the driving speed of the driving member becomes larger when moving the driven member in a direction in which a traveling load of the driven member is increased than when moving the driven member in a direction in which the traveling load of the driven member is decreased.

According to this aspect of the invention, the drive signal is supplied to the electro-mechanical conversion element so that the driving speed of the driving member becomes larger when moving the driven member in the direction in which the traveling load of the driven member is increased than when moving the driven member in the direction in which the traveling load of the driven member is decreased. Because of this, even in the event that the traveling speed of the driven member in the direction in which the traveling load is increased is decreased when the same drive signal is supplied to the electro-mechanical conversion element, the change in traveling speed of the driven member can be suppressed.

In addition, in the driving apparatus according to the invention, the different drive signals are preferably such that their signal frequencies are changed. Additionally, in the driving apparatus according to the invention, the different drive signals are preferably such that their waveforms are changed.

DETAILED DESCRIPTION OF THE INVENTION

Hereinafter, an embodiment of the invention will be described in detail by reference to the accompanying drawings. Note that in description of the drawings, like reference numerals are imparted to like elements, and the repetition of the same description will be omitted.

Figure 1:
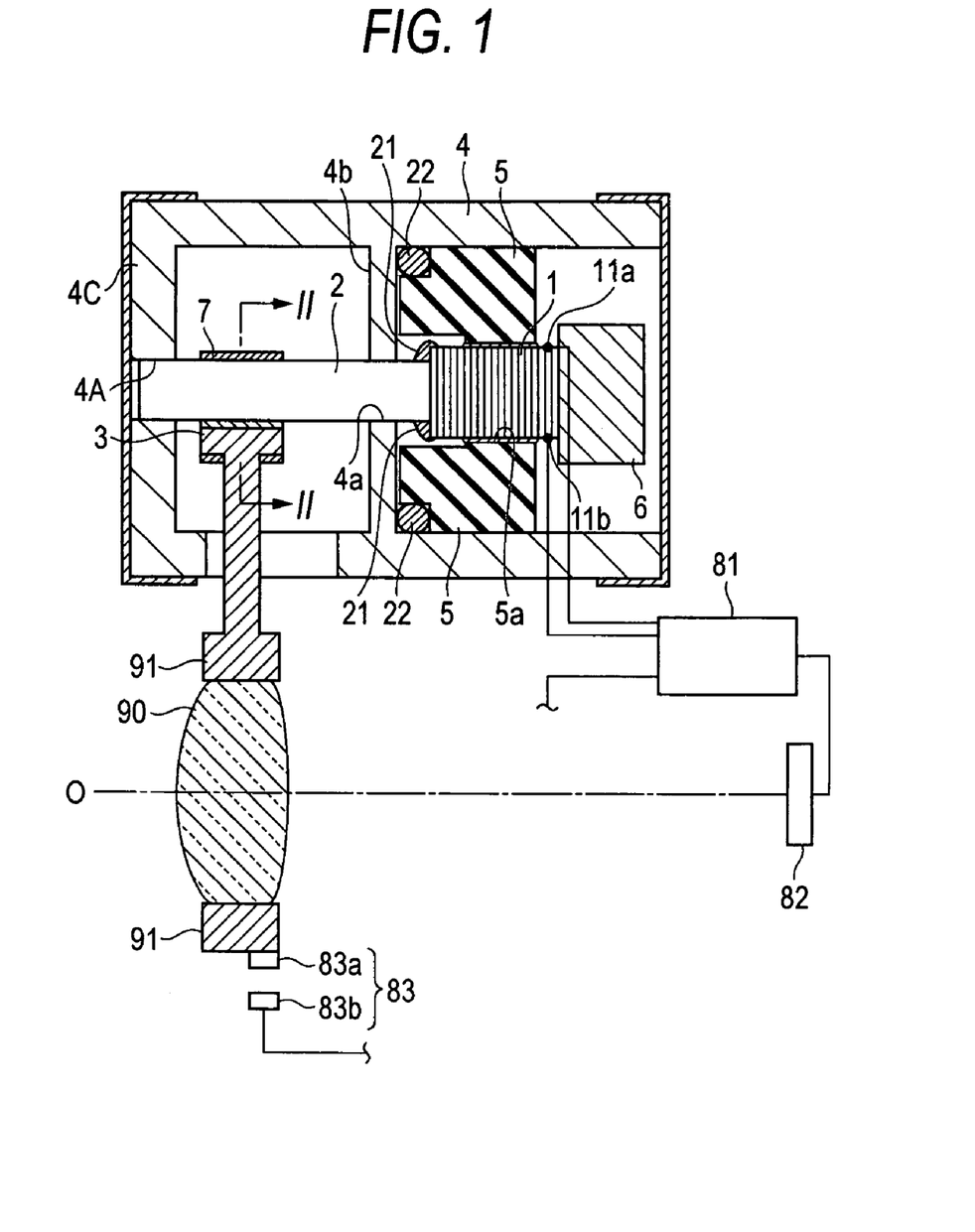
FIG. 1 is a sectional view which shows a driving apparatus according to an embodiment of the invention.

FIG. 1 is a sectional view of a driving apparatus according to an embodiment of the invention. As is shown in FIG. 1, the driving apparatus according to the embodiment is such as to move a driven member 3 which is frictionally engaged with a drive shaft 2 along the drive shaft 2 by moving the drive shaft 2 backwards and forwards in a straight line in response to extension and contraction of a piezoelectric element 1.

The piezoelectric element 1 is an electro-mechanical conversion element which can extend and contract when electric signals are inputted and is designed to extend and contract in a predetermined direction. This piezoelectric element 1 is connected to a control unit 81, so as to be caused to extend and contract when electric signals are inputted by the control unit 81. For example, two input terminals 11a, 11b are provided on the piezoelectric element 1. By repeatedly increasing and decreasing a voltage that is impressed to these input terminals 11a, 11b, the piezoelectric element 1 is caused to extend and contract repeatedly.

The drive shaft 2 is a driving member which is driven backwards and forwards in a straight line in response to extension and contraction of the piezoelectric element 1 and is attached to the piezoelectric element 1 with its longitudinal direction oriented in the direction of extension and contraction of the piezoelectric element 1. For example, one end of the drive shaft 2 is brought into abutment with the piezoelectric element 1 and is bonded thereto using an adhesive 21. The drive shaft 2 is a long member, and for example, a circular pillar-like part is used therefor. The drive shaft 2 is supported longitudinally movably by partitioning portions 4b, 4c which extend inwards from a stationary frame 4. The partitioning members 4b, 4c are members for defining a traveling area of the driven member 3 and also function as support members for supporting the drive shaft 2. The stationary frame 4 functions as a box element in which the piezoelectric element 1, the drive shaft 2 and the driven member 3 are accommodated for assemblage.

A soft and highly rigid material is suitable as a material for the drive shaft 2, and beryllium is an ideal material which satisfies the condition. Beryllium has drawbacks, however, that it is expensive because it is a scarce metal and is difficult to work. Then, in this embodiment, a graphite composite material such as carbon graphite is used in which graphite crystals are combined strongly and rigidly. (Here, the graphite composite material means a composite material made up of a graphite which is a hexagonal plate-shaped crystalline form of carbon and a substance other than graphite, and carbon graphite means a substance which is made up of graphite and amorphous carbon. In addition, graphite is also called black lead or plumbago.) Carbon graphite, which is a graphite composite material, has a property which is similar to beryllium (the specific weight of beryllium is about 1.85, while the specific weight of carbon graphite is about 1.8) and a property that it is easy to work, compared to beryllium. Note that the shape of the drive shaft 2 is not limited to the circular pillar-like shape and hence may be formed into an angular pillar-like shape.

A through hole 4a is formed in each of the partitioning portions 4b, 4c through which the drive shaft 2 is passed. The partitioning portion 4b supports the drive shaft 2 at a location in the vicinity of a portion where the drive shaft 2 is attached to the piezoelectric element 1, that is, a proximal end location of the drive shaft 2. The partitioning portion 4c supports a distal end location of the drive shaft 2. By being attached to the piezoelectric element 1, the drive shaft 2 reciprocates along the longitudinal direction thereof in response to extension and contraction of the piezoelectric element 1.

Note that while in FIG. 1, the case is described in which the drive shaft 2 is supported at the two proximal end side and distal end side locations by the partitioning portions 4b, 4c, there may occur a case where the drive shaft 2 is supported on either the proximal end side or the distal end side thereof. For example, by forming the through hole 4a in the partitioning portion 4b larger than the outside diameter of the drive shaft 2, the drive shaft 2 is supported at only the distal end location by the partitioning portion 4c. In addition, by forming the through hole 4a in the partitioning portion 4c larger than the outside diameter of the drive shaft 2, the drive shaft 2 is supported at only the proximal end location by the partitioning portion 4b.

In addition, while in FIG. 1, the partitioning portions 4b, 4c which support the drive shaft 2 are described as being integrated with the stationary frame 4, these partitioning portions 4b, 4c may be made up of separate elements from the stationary frame 4, so as to be mounted on the stationary frame 4 afterwards. Also when the partitioning portions are formed as separated elements, a similar function and advantage to those provided by the integrated partitioning portions can be obtained.

The driven member 3 is movably mounted on the drive shaft 2. This driven member 3 is mounted on the drive shaft 2 in such a state that the driven member 3 is frictionally engaged with the drive shaft 2 and is allowed to move along the longitudinal direction of the drive shaft 2. For example, the driven member 3 is brought into press contact with the drive shaft 2 by means of a leaf spring 7 so as to be frictionally engaged with the drive shaft 2 with a predetermined friction coefficient, so as to be pressed against the drive shaft 2 under a certain determined pressure, whereby the driven member 3 is mounted on the drive shaft 2 in such a manner as to produce a certain determined frictional force as it moves. When the drive shaft 2 moves to overcome the frictional force, the driven member 3 maintains the position where it is by virtue of inertia, whereby the drive shaft 2 moves relative to the driven member 3.

The piezoelectric element 1 is mounted on the stationary frame 4 by a support member 5. The support member 5 is such as to be mounted in such a manner as to support the piezoelectric element 1 from sides thereof relative to the direction of extension and contraction thereof and is interposed between the piezoelectric element 1 and the stationary frame 4. In this case, the piezoelectric element 1 is preferably supported by the support member 5 from a direction which intersects the direction of extension and contraction of the piezoelectric element 1 at right angles. The support member 5 functions as a mounting member which supports the piezoelectric element 1 from the sides thereof for mounting.

The support member 5 is formed of an elastic element having an elastic property which is equal to or larger than a predetermined level and is formed of, for example, a silicone resin. The support member 5 is made to have a through hole 5a which is provided so that the piezoelectric element 1 is passed therethrough and is assembled to the stationary frame 4 in such a state that the piezoelectric element 1 is inserted thereinto. The support member 5 is secured to the stationary frame 4 by virtue of bonding using an adhesive 22. In addition, the support member 5 is also secured to the piezoelectric element 1 by virtue of bonding using the adhesive. By making up the support member 5 of the elastic element, the support member 5 can support the piezoelectric element 1 in such a manner as to move in the direction of extension and contraction thereof. In FIG. 1, although two support members 5 are illustrated to lie on both the sides of the piezoelectric element 1, respectively, these support members 5, 5 are so illustrated due to the annular support member 5 being shown in a sectional view which results by cutting it along a horizontal plane.

In addition, the support member 5 may be secured to the stationary frame 4 and the piezoelectric element 1 by press fitting the support member 5 between the stationary frame 4 and the piezoelectric element 1 so that the support member 5 is pressed against the stationary frame 4 and the piezoelectric element 1, respectively. For example, a support member 5 is made up of an elastic element larger than a space defined between the stationary frame 4 and the piezoelectric element 1, and the support member 5 so made is press fitted into the space so as to be placed therein. As this occurs, the support member 5 is provided in such a manner as to be closely secured to the stationary frame 4 and the piezoelectric element 1. As this occurs, the piezoelectric element 1 is pressed against the support member 5 from both the sides thereof in the direction which intersects the direction of extension and contraction of the piezoelectric element 1 at right angles, whereby the piezoelectric element 1 is supported.

In addition, while the support member 5 has been described as being formed of the silicone resin here, the support member 5 may be made up of a spring member. For example, a spring member is interposed between the stationary frame 4 and the piezoelectric element 1 so that the piezoelectric element 1 is supported relative to the stationary frame 4 by this spring member.

A movable lens 90 is mounted on the driven member 3 via a lens frame 91. The movable lens 90 is such as to make up a photographic optical system of a camera and constitutes an object to be moved by the driving apparatus. This movable lens 90 is provided integrally with the driven member 3 and is provided in such a way as to move together with the driven member 3. A stationary lens and the like, not shown, are provided on an optical axis O of the movable lens 90, so as to make up the photographic optical system of the camera. In addition, a photographic device 82 is provided on the optical axis O. The photographic device 82 is a photographic unit for converting an image formed by the photographic optical system into an electric signal and is made up of, for example, a CCD. The photographic device 82 is connected to the control unit 81 and output an image signal to the control unit 81.

A weight member 6 is attached to an end portion of the piezoelectric element 1. The weight member 6 is a member for transmitting extension and contraction forces of the piezoelectric element 1 to the drive shaft 2 side and is attached to the end portion of the piezoelectric element 1 which is opposite to an end portion where the drive shaft 2 is mounted. A part which is heavier than the drive shaft 2 is used as the weight member 6. In addition, as the weight member 6, a part is preferably used in which metallic powder is mixed into an elastically deformable material. The mixing of the metallic powder can increase the weight of the weight member 6, and the utilization of the elastically deformable material can dampen unnecessary resonance at the time the piezoelectric element is put into operation.

A material whose Young's modulus is smaller than those of the piezoelectric element 1 and the drive shaft 2 is used as a material for the weight member 6. As the Young's modulus of the weight member 6, 1 GPa or less is preferable, and 300 MPa or less is more preferable. The weight member 6 like this is formed by mixing metallic powder whose specific weight is large into an elastic material such as rubber, and the weight member 6 is produced by mixing tungsten powder into a urethane resin or urethane rubber. In order to reduce the size of the driving apparatus, the specific weight of the weight member 6 is preferably as large as possible and is set substantially to range, for example, from 8 to 12. In addition, when producing a weight member 6 by mixing tungsten powder into urethane rubber or urethane resin, a Young's modulus of the order of 60 MPa and a specific weight of the order of 11.7 result. Consequently, when wanting to design a weight member 6 which has as small a volume as possible, although a weight member 6 is optimum which has a combination of a large specific weight and a small Young's modulus, a weight member 6 can be used which has a specific weight (1.8 or larger) larger than that of the driving member 2 and a Young's modulus of 1 GPa or less. Namely, a member is suitable for the weight member 6 in which a numerical value resulting by dividing its specific weight by its Young's modulus (specific weight/Young's modulus) is equal to or larger than $1.8 \times 10^{-9}$. Note that as an adhesive for bonding the weight member 6 and the piezoelectric element 1 together, an elastic adhesive is preferably used.

In addition, the weight member 6 is made up of a soft material, whereby a resonance frequency in the piezoelectric element 1 and the driving member 2 can be decreased sufficiently relative to a driving frequency in the piezoelectric element 1, so as to reduce the resonance effect. Assuming that for example, the driving frequency of the piezoelectric element 1 is f, and the resonance frequency of vibrations in the piezoelectric element 1 and the driving member 2 is $f_0$, it is preferable to satisfy a relationship of $f \geq 2^{1/2} \cdot f_0$. As this occurs, the vibration transmission rate of vibration resulting from the extension and contraction motions of the piezoelectric element 1 can be suppressed to a range equal to 1 or less, thereby making it possible to reduce the resonance effect. As a combination of frequencies, for example, the resonance frequency $f_0$ is made to be equal to or less than 70 kHz, and the driving frequency f is made to range from 50 to 100 kHz, whereby the aforesaid relationship of $f \geq 2^{1/2} \cdot f_0$ can be satisfied.

In addition, the weight member 6 is provided in such a state that the member is not fixed or supported relative to the stationary frame 4. Namely, the weight member 6 is attached to a free end of the piezoelectric element 1 and is provided in such a state that the weight member 6 is neither directly supported or fixed relative to the stationary frame 4 nor is supported or fixed relative to the stationary frame 4 via an adhesive or resin material in such a manner that its movement is restrained.

A detector 83 is provided on the driving apparatus for detecting a moving position of the driven member 3. As the detector 83, for example, an optical detector is used, and a photoreflector, photointerrupter or the like is used. To be specific, in a case where a device including a reflector 83*a* and a detecting unit 83*b* is used as the detector 83, the reflector 83*a* is attached to the lens frame 91 which is formed integrally with the driven member 3, whereby a detection light is emitted from the detecting unit 83*b* to the reflector 83*a* side, and a reflection light which is reflected by the reflector 83*a* side is then detected by the detecting unit 83*b* so as to detect the moving position of the driven member 3 and the movable lens 90.

The detector 83 is connected to the control unit 81. An output signal of the detector 83 is inputted into the control unit 81. The control unit 81 is such as to control the whole of the driving apparatus, and is made up of, for example, a CPU, a ROM, a RAM, an input signal circuit, an output signal circuit and the like. In addition, the control unit 81 includes a driving circuit for activating the piezoelectric element 1 for operation and functions as a drive control unit for supplying a drive signal to the piezoelectric element 1 for drive so as to implement the control of extension and contraction of the piezoelectric element 1 and supplying different drive signals according to the position of the driven member 3 relative to the drive shaft 2.

Figure 2:
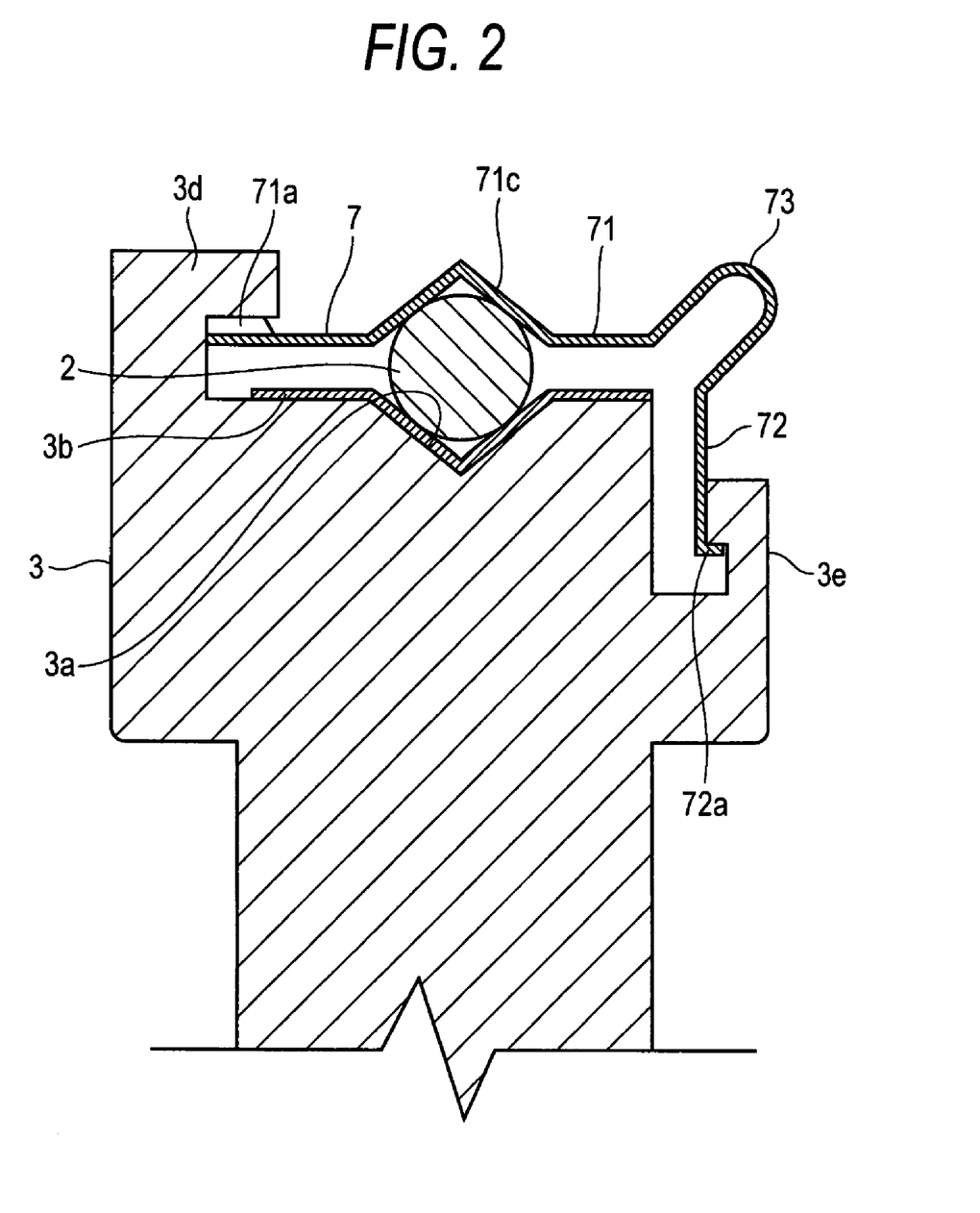
FIG. 2 is a sectional view of a driven member taken along the line II-II in FIG. 1.

FIG. 2 is a sectional view of a frictional engagement portion of the driven member 3 which is taken along the line II-II in FIG. 1.

As is shown in FIG. 2, the driven member 3 is brought into press contact with the drive shaft 2 by a leaf spring 7 in such a manner that the driving member 3 is frictional engaged with the drive shaft 2. A V-shaped groove 3*a* is formed in the driven member 3. A sliding plate 3*b* is additionally provided on a surface of the groove 3*a* so formed. The sliding plate 3*b* is a plate element on which the drive shaft 2 slides and is bent into a shave having a V-shaped cross section to match the surface configuration of the groove 3*a*. The attachment of the sliding plate 3*b* to the driven member 3 is implemented by an adhesive. In addition, the sliding plate 3*b* may be molded integrally with the driven member 3. The sliding plate 3*b* is made of, for example, a material which is harder than the driven member 3.

The drive shaft 2 is placed within the groove 3*a* in such a way as to be brought into abutment with the sliding plate 3*b*. The leaf spring 7 is provided in such a way as to hold the drive shaft 2 between the driven member 3 and itself. The leaf spring 7 is provided to be oriented towards a direction which intersects the drive shaft 2 and is provided, for example, in a direction in which the leaf spring 7 intersects the drive shaft 2 at right angles.

The leaf spring 7 is formed to be bent into an L-shape and is made up of a plate-shaped piece 71 which is adapted to be brought into abutment with the drive shaft 2 and a plate-shaped piece 72 which is formed to be bent relative to the plate-shaped piece 71. Here, the L-shape includes not only a case where the leaf spring 7 is bent such that the plate-shaped pieces 71, 72 intersect each other at right angles but also a case where the leaf spring 7 is bent such that the plate-shaped pieces 71, 72 intersect each other at angles in a range of the order of are 90+/−20°.

End portions of the plate-shaped pieces 71, 72 are hooked on the driven member 3, respectively. Namely, both ends of the leaf spring 7 are not fastened by screws but are hooked on the driven member 3, respectively. The end portion of the plate-shaped piece 71 is hooked on a hook portion 3*d* which is formed on the driven member 3 in the form of a hook. The end portion of the plate-shaped piece 72 is hooked on a hook portion 3*e* which is formed on the driven member 3 in the form of a hook. A hook portion 72*a* is formed at the end portion of the plate-shaped piece 72 in such a manner as to be bent outwards. The hook portion 72*a* is in engagement with the hook portion 3*e*, whereby a sliding dislocation of the plate-shaped piece 72 in the longitudinal direction is prevented.

Figure 3:
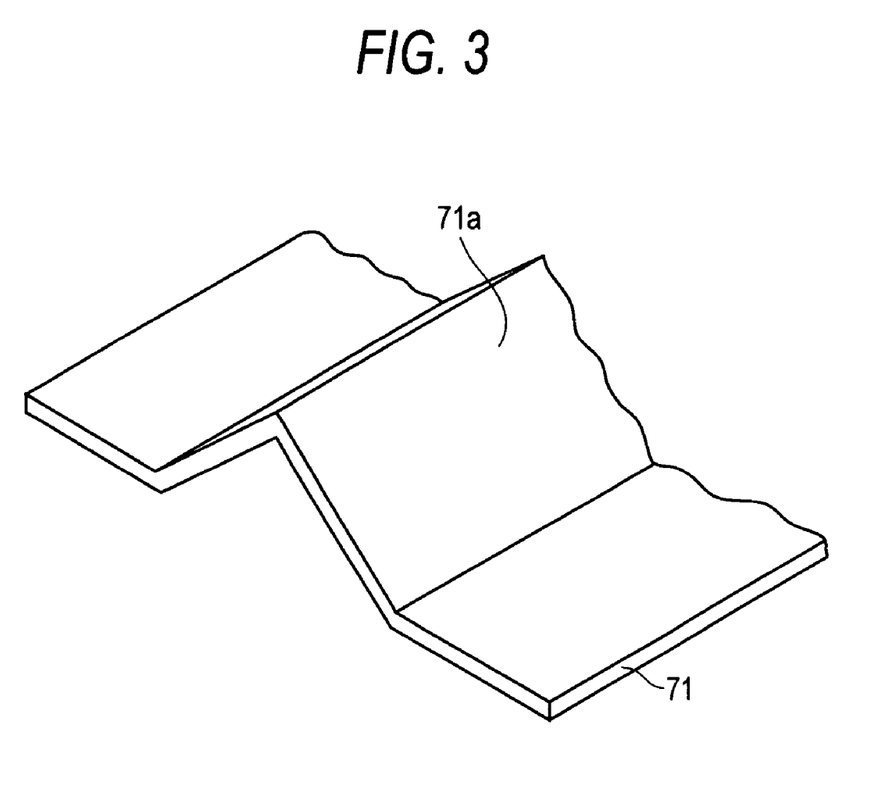
FIG. 3 is an enlarged perspective view of an end portion of a leaf spring in the driving apparatus shown in FIG. 1.

A projecting portion 71*a* which projects outwards is formed at the end portion of the plate-shaped piece 71. The projecting portion 71*a* constitutes a location where the leaf spring 7 is brought into point contact with the driven member 3. This projecting portion 71*a* is formed by, for example, as is shown in FIG. 3, bending a central portion of the end portion of the leaf spring 7 into an inverted V-shape along the longitudinal direction thereof.

As is shown in FIG. 2, a sliding portion 71*c* which is bent into an inverted V-shape is formed at an intermediate portion of the plate-shaped piece 71 of the leaf spring 7. The sliding portion 71*c* is brought into abutment with the drive shaft 2, whereby the driven member 3 and the drive shaft 2 are brought into press contact with each other under a predetermined pressure, and a state results in which the driven member 3 and the drive shaft 2 are in frictionally engaged with each other with a predetermined friction coefficient. This sliding portion 71*c* is formed in a position which faces the groove 3*a* in the driven member 3.

A curved portion 73 is formed at the bent portion of the leaf spring 7 in such a manner as to project outwards. The curved portion 73 is provided at a curved portion between the plate-shaped piece 71 and the plate-shaped piece 72 and is formed to project to the outside of the curve in a curved fashion compared to a case where the plate-shaped piece 71 and the plate-shaped piece 72 are connected together at right angles to each other.

By holding the drive shaft 2 by the sliding plate 3b having the V-shaped cross section and the sliding portion 71c having the inverted V-shaped cross section in this way, the driven member 3 is made to be brought into linear contact with the drive shaft 2 at a plurality of locations, whereby the driven member 3 can be brought into frictional engagement with the drive shaft 2 in a stable fashion. In addition, since the driven member 3 is in engagement with the drive shaft 2 by virtue of the linear contact state realized at the plurality of locations, an engagement state substantially results which is similar to an engagement state in which the driven member 3 is in surface engagement with the drive shaft 2, thereby making it possible to realize a stable friction engagement therebetween.

Note that while in FIG. 2, the sliding plate 3b is formed into the shape having the V-shaped cross section and the sliding portion 71c is formed into the shape having the inverted V-shaped cross section, the sliding plate 3b and the sliding portion 71c may be made into a shape having an arc-shaped cross section which extends along a circumferential surface of the drive shaft 2, so as to be brought into surface contact with the drive shaft 2. As this occurs, since the driven member 3 is brought into engagement with the drive shaft 2 in such a state that the driven member 3 is in surface contact with the drive shaft 2, the driven member 3 is allowed to be brought into frictional engagement with the drive shaft 2 in a stabler fashion.

Figure 4:
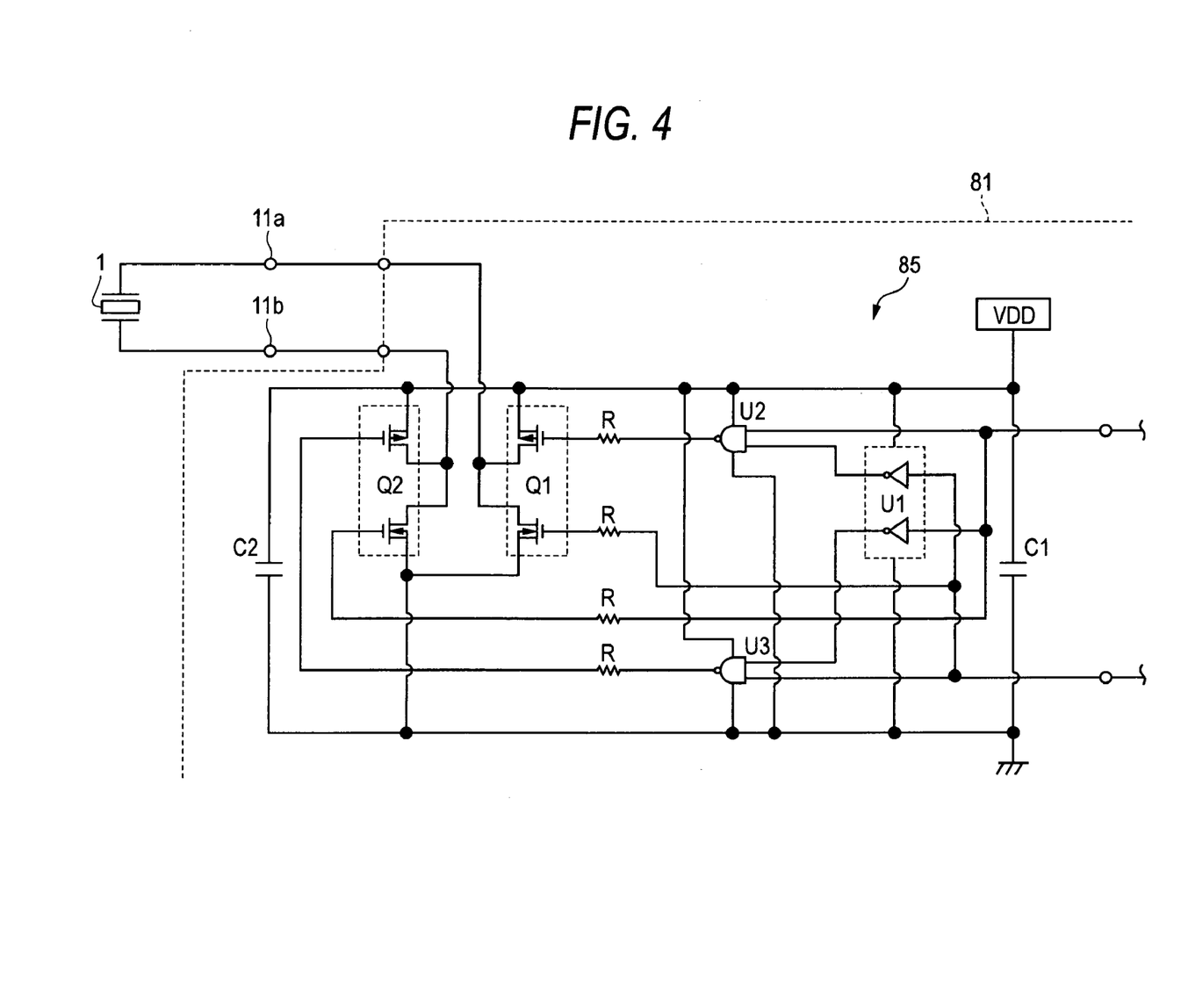
FIG. 4 is a diagram showing a driving circuit in the driving apparatus shown in FIG. 1.

FIG. 4 is a circuit diagram of a driving circuit for operating the piezoelectric element 1.

As is shown in FIG. 4, a driving circuit 85 is provided to be disposed within the control unit 81. This driving circuit 85 is such as to function as a drive circuit for the piezoelectric element 1 and to output a driving electric signal to the piezoelectric element 1. The driving circuit 85 receives a control signal which is inputted thereinto from a control signal generating unit (not shown) of the control unit 81 and outputs a driving electric signal for the piezoelectric element 1 by amplifying the control signal with respect to voltage or current. For example, a circuit in which an input stage is made up of logic circuits U1 to U3 and field-effect transistors (FET) Q1, Q2 are provided for use as an output state is used for the driving circuit 85. The transistors Q1, Q2 are designed to be able to output, as output signals, an H output (a high potential output), an L output (a low potential output) and an OFF output (an open output).

Figure 5A:
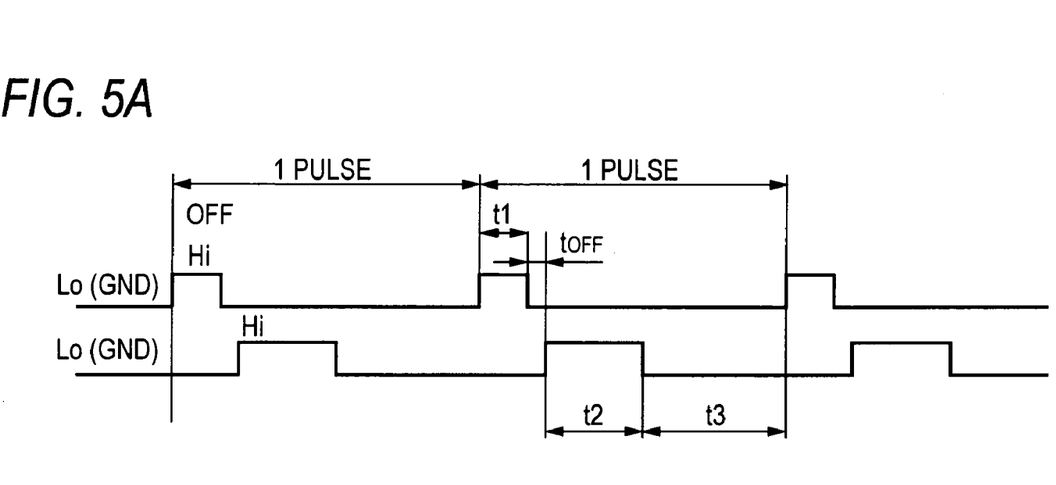
FIG. 5 is a waveform diagrams of input signals which are inputted into the driving circuit shown in FIG. 4.
Figure 5B:
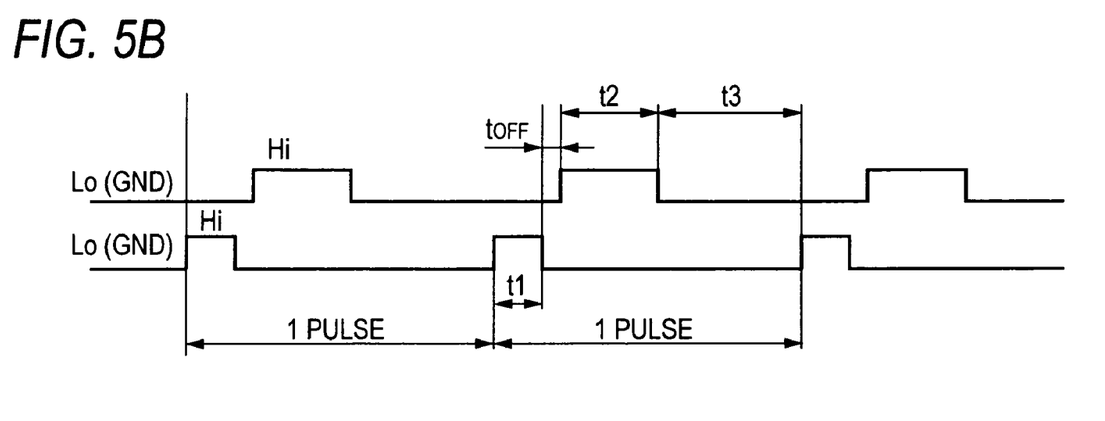
Figure 6A:
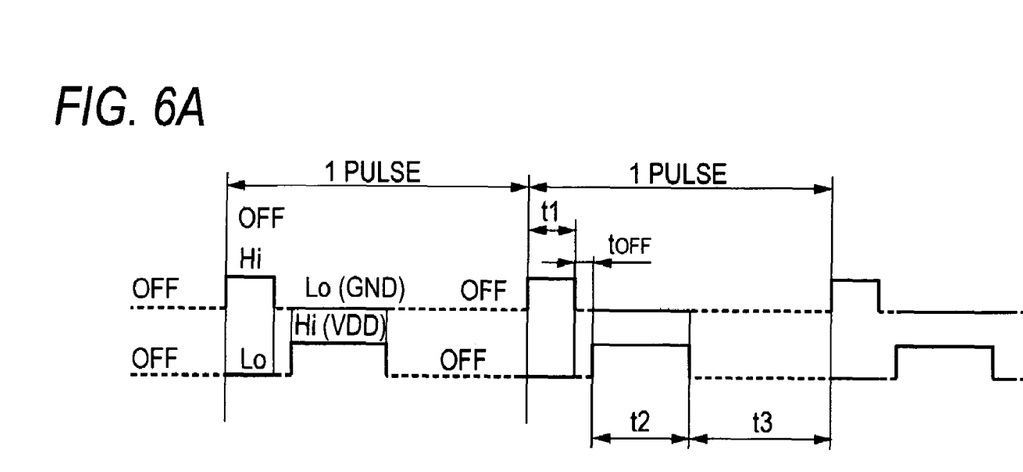
FIG. 6 is a waveform diagrams of output signals which are outputted from the driving circuit shown in FIG. 4.
Figure 6B:
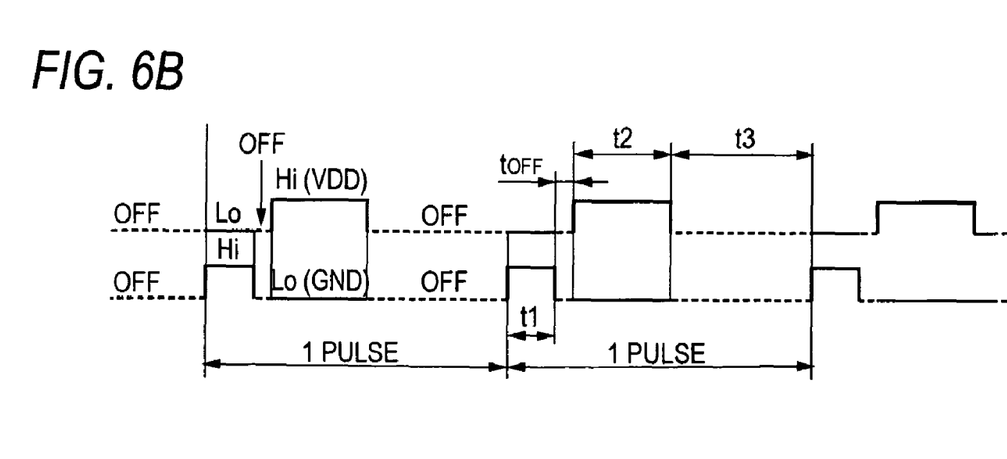

FIG. 5 shows input signals which are inputted into the driving circuit 85, and FIG. 6 shows output signals which are outputted from the driving circuit 85. In FIGS. 5, 6, an axis of ordinate represents voltage, while an axis of abscissa represents time. FIG. 5(A) shows an input signal which is inputted when causing the driven member 3 to move in the direction in which the driven member 3 approaches the piezoelectric element 1 (rightwards as seen in FIG. 1), and FIG. 5(B) shows an input signal which is inputted when causing the driven member 3 to move in the direction in which the driven member 3 moves away from the piezoelectric element 1 (leftwards as seen in FIG. 1). In addition, FIG. 6(A) shows an output signal which is outputted when causing the driven member 3 to move in the direction in which the driven member 3 approaches the piezoelectric element 1 (rightwards as seen in FIG. 1), and FIG. 6(B) shows an output signal which is outputted when causing the driven member 3 to move in the direction in which the driven member 3 moves away from the piezoelectric element 1 (leftwards as seen in FIG. 1).

The output signals in FIGS. 6(A), (B) are made to be pulse signals which are on and off at the same timing as the input signals shown in FIGS. 5(A), (B). The two signals in FIGS. 6(A), (B) are inputted into the input terminals 11a, 11b of the piezoelectric element 1. Although signals made up of trapezoidal waveforms may be inputted into the input terminals 11a, 11b, the rectangular pulse signals shown in FIG. 6 can be inputted so as to activate the piezoelectric element 1. As this occurs, since the driving signal of the piezoelectric element 1 may take the form of the rectangular pulse signal, the signal generation is facilitated.

The output signals shown in FIGS. 6(A), (B) are each made up of two rectangular pulse signals having the same frequency. These two pulse signals are made to be signals in which a potential difference between respective signals increases in a stepped fashion and decreases drastically or the potential difference increases drastically and decreases in a stepped fashion by causing their phases to differ from each other. By inputting the two signals, the extension speed and contraction speed of the piezoelectric element 1 can be caused to differ from each other, whereby the driven member 3 can be caused to move.

For example, of the two signals shown in FIGS. 6(A), (B), it is set such that the other signal becomes H (high) after one signal becomes H (high) and is then decreased to L (low). In those signals, it is set such that when one signal becomes L, the other signal becomes H after a certain determined time lag $t_{OFF}$ has elapsed. In addition, in the event that the two signals are both L, the output state becomes an off state (an open state).

As the output signals or electric signals shown in FIG. 6(A), (B) which activate the piezoelectric element 1, a signal is used whose frequency exceeds the audible frequency. In FIGS. 6(A), (B), the frequencies of the two signals are made to be a signal frequency which exceeds the audible frequency, and a signal frequency of, for example, 30 to 80 kHz is preferably used, and a signal frequency of 40 to 60 kHz is more preferably used. By using signals having these frequencies, the operation noise of the piezoelectric element 1 within the audible frequency area can be reduced.

Next, the operation of the driving apparatus according to the embodiment will be described.

In FIG. 1, drive signals which are outputted from the control unit 81 are inputted into the piezoelectric element 1, and the piezoelectric element 1 repeats its extension and contraction when the drive signals are so inputted. The drive shaft 2 reciprocates in response to the extension and contraction of the piezoelectric element 1. As this occurs, by causing the extension speed and contraction speed of the piezoelectric element 1 to differ from each other, a speed at which the drive shaft 2 moves to a certain determined direction and a speed at which the drive shaft 2 moves to an opposite direction are caused to differ from each other, whereby the driven member 3 and the movable lens 90 can be caused to move in desired directions.

As this occurs, different drive signals are supplied to the piezoelectric element 1 from the control unit 81 according to the position of the driven member 3 relative to the drive shaft 2. Namely, a whole traveling area of the driven member 3 is divided into a plurality of areas, and different drive signals are supplied to the piezoelectric element 1 according to traveling characteristics of the driven member 3 in the divided areas. For example, a drive signal is supplied to the piezoelectric element 1 so that a driving speed of the drive shaft 2 becomes larger in a position lying at an end portion side than a position lying on a center side of the drive shaft 2. In this case, a whole traveling area of both of an outgoing traveling path and an incoming traveling path of the driven member 3 may be divided into a plurality of divided areas and drive control may be performed on the respective divided areas. Or a whole traveling area of one of an outgoing traveling path and an incoming traveling path of the driven member 3 may be divided into a plurality of divided areas and drive control may be performed on the respective divided areas.

Figure 7:
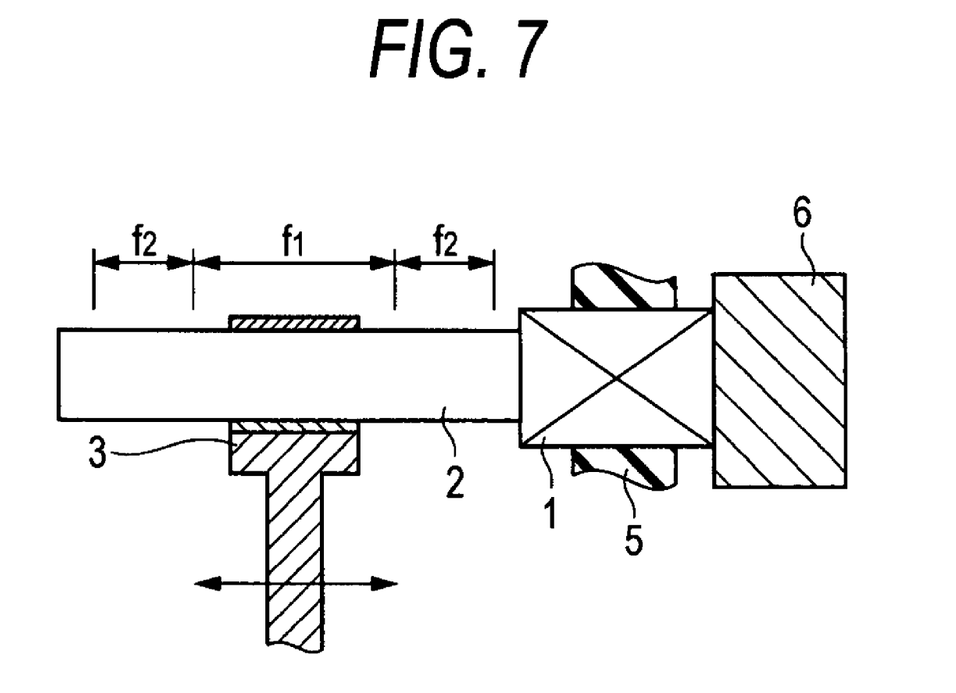
FIG. 7 is an explanatory diagram which explains the operation of the driving apparatus shown in FIG. 1.

As drive signals, for example, as is shown in FIG. 7, the frequency of the drive signal is made to be a predetermined frequency of f1 at a central area of the whole traveling area of the driven member 3, while at end portion areas of the traveling range of the driven member 3, the frequency of the drive signal is made to be f2 which is larger than f1. To describe a specific drive control, for example, the position of the driven member 3 is determined by a supply time of a drive signal or the number of pulses, and when the driven member 3 lies in the end portion area, a drive signal of the frequency f2 is supplied to the piezoelectric element 1, while when the driven member 3 lies in the central area, a drive signal of the frequency f1 is supplied to the piezoelectric element 1. In addition, the position of the driven member 3 is detected by the detector 83 in advance, and when the driven member 3 lies in the end portion area, a drive signal of the frequency f2 may be supplied to the piezoelectric element 1, while when the driven member 3 lies in the central area, a drive signal of the frequency f1 may be supplied to the piezoelectric element 1.

Figure 8:
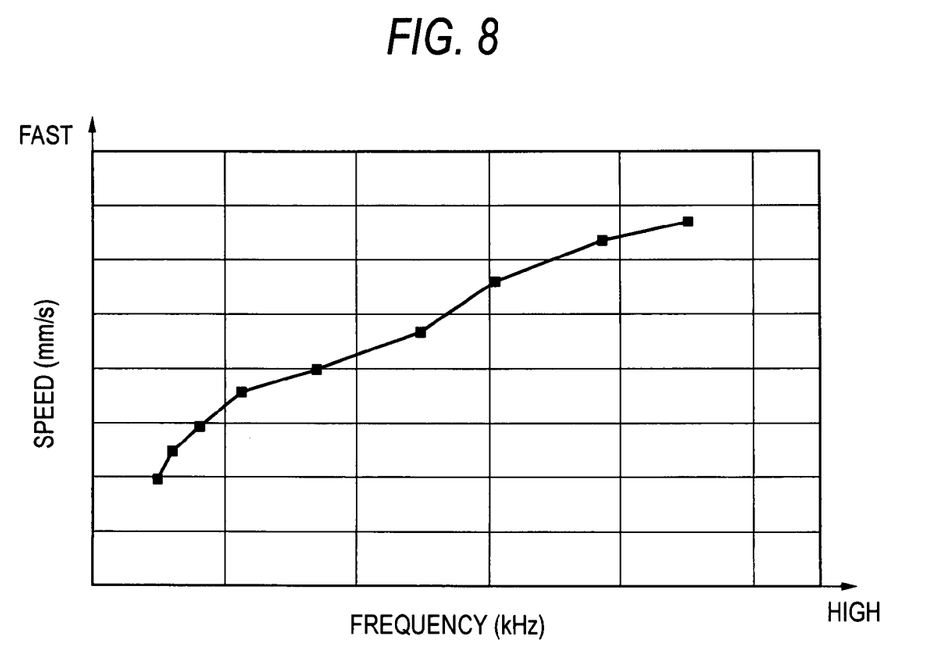
FIG. 8 is a graph which shows the relationship between the frequency of a drive signal and the traveling speed of the driven member in the driving apparatus shown in FIG. 1.

As this occurs, as is shown in FIG. 8, when the frequency of the drive signal is increased, the traveling speed of the driven member 3 is increased. Because of this, the traveling distance of the driven member 3 can be made larger than when it is normally driven by driving the piezoelectric element 1 by a drive signal of a high frequency when the driven member 3 lies in the end portion area. On the other hand, the traveling distance of the driven member 3 can be made smaller than when it is normally driven by driving the piezoelectric element 1 by a drive signal of a low frequency when the driven member 3 lies in the central area.

Thus, by supplying drive signals having different frequencies to the piezoelectric element 1 according to the position of the driven member 3 relative to the drive shaft 2 in this way, in the event that the traveling speed of the driven member is decreased in a position which lies on the end portion side of the drive shaft 2 when the same drive signals are supplied to the piezoelectric element 1, the occurrence of such a change in the traveling distance of the driven member 3 can be suppressed, whereby the driven member 3 can be caused to travel at a uniform speed, thereby making it possible to implement the traveling control easily and accurately.

In addition, the change in the traveling distance of the driven member 3 may be controlled by changing the waveform of the drive signal between when the driven member 3 lies in the end portion area and when the driven member 3 lies in the central area. For example, in drive signals shown in FIGS. 6(A), (B), signal waveforms having different voltage change rates can be obtained by changing a time t1 between when the driven member 3 lies in the end portion area and when the driven member 3 lies in the central area, so that the traveling distance of the driven member 3 can be made larger when the driven member 3 lies in the end portion area than when the driven member 3 lies in the central area.

Figure 9:
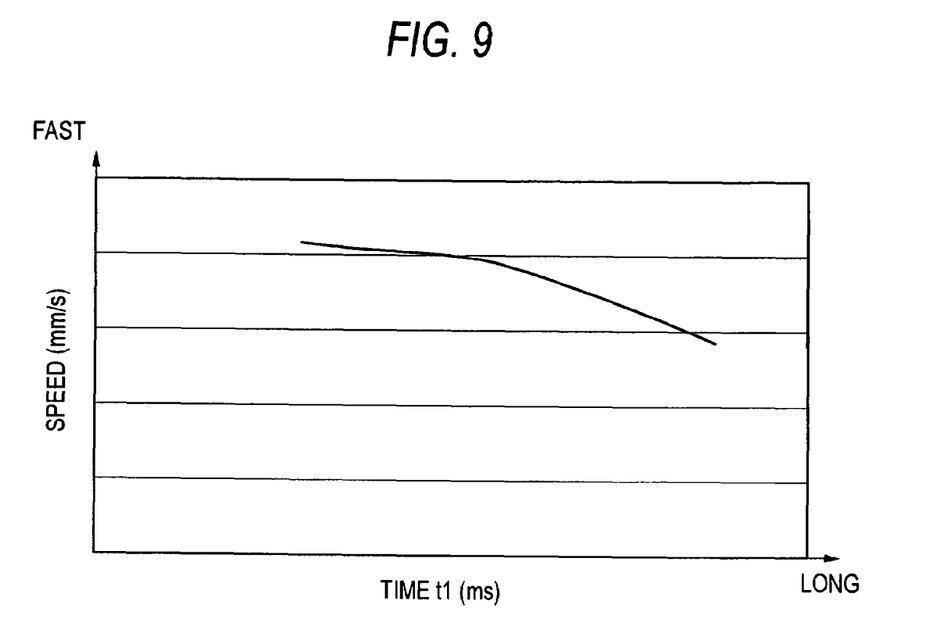
FIG. 9 is a graph which shows the relationship between a time t1 of the drive signal and the traveling speed of the driven member in the driving apparatus shown in FIG. 1.

As is shown in FIG. 9, in the drive signals shown in FIGS. 6(A), (B), the traveling speed of the driven member becomes slower as the time t1 becomes longer. Because of this, the traveling distance of the driven member 3 can be made larger than when the driven member 3 is normally driven by driving the piezoelectric element 1 by a drive signal whose time t1 is short. On the contrary, the traveling distance of the driven member 3 can be made smaller than when the driven member 3 is normally driven by driving the piezoelectric element 1 by a drive signal whose time t1 is long.

In addition to the case where the time t1 in the drive signals shown in FIGS. 6(A), (B) is changed to have different signal waveforms as has been described above, drive signals having different waveforms as a result of changing a time t3 in those drive signals may be supplied to the piezoelectric element 1. In this case, too, the same function and advantage as those given by the case where the time t1 is changed can be obtained.

In addition to the case where different drive signals are obtained by changing the length of on-time or off-time of the drive signal as has been described above, different drive signals may be obtained by changing the voltage of on-time or off-time of the drive signal. In this case, too, the traveling distance of the driven member 3 or the traveling speed thereof can be adjusted by use of drive signals having different waveforms.

Thus, by supplying drive signals having different signal waveforms to the piezoelectric element 1 according to the position of the driven member 3 relative to the drive shaft 2 in this way, even in the event that the traveling distance of the driven member is decreased in a position which lies on the end portion side of the drive shaft 2 when the same drive signals are supplied to the piezoelectric element 1, the occurrence of such a change in the traveling distance of the driven member 3 can be suppressed, whereby the driven member 3 can be caused to travel at a uniform speed, thereby making it possible to implement the traveling control easily and accurately.

In addition, the driving speed of the drive shaft 2 may be controlled by supplying different drive signals according to the traveling direction of the driven member 3 relative to the drive shaft 2. For example, when the traveling speed of the driven member 3 differs depending upon the traveling direction of the driven member 3 relative to the drive shaft 2, a drive signal is supplied to the piezoelectric element 1 which increases the driving speed of the drive shaft 2 to become larger when the driven member 3 is traveling in a direction in which its traveling speed is decreased than when the driven member is traveling in a direction in which its traveling speed is increased. To be specific, a traveling control is implemented so as to increase the traveling distance of the driven member 3 by increasing the frequency of the drive signal to become larger when the driven member 3 is traveling in a direction in which its traveling speed is decreased than when the driven member is traveling in a direction in which its traveling speed is increased, whereby the change in the traveling speed of the driven member 3 depending upon its traveling direction can be suppressed, thereby making it possible to implement the traveling control of the driven member 3 easily and accurately. In this case, by changing the waveform of the drive signal, the traveling speed of the driven member 3 may be increased when the driven member 3 is traveling in the direction in which its traveling speed is decreased.

Note that when used here, the "different drive signals" mean drive signals which differ the traveling speed of the drive shaft 2. For example, although the drive signal in FIG. 6(A) and the drive signal in FIG. 6(B) are signals having different waveforms, since they are signals in which only the time axis is reversed between the outgoing traveling path and the incoming traveling path of the driven member 3 and hence, are not signals which differ the driving speed of the drive shaft 2, those drive signals are not the different drive signals which are so meant here.

In addition, when the driving speed of the drive shaft 2 is controlled by supplying the different drive signals according to the traveling directions of the driven member 3 relative to the drive shaft 2, further different drive signals may be supplied to the piezoelectric signal 1 depending on the position of the driven member 3 relative to the drive shaft 2 in the respective traveling directions. For example, in addition to supplying the different drive signals to the piezoelectric element 1 depending upon the traveling directions of the driven member 3, the whole traveling area of the driven member 3 in each of the traveling directions is divided into a plurality of dived areas, so that further different drive signals may be supplied to the piezoelectric element 1 according to traveling characteristics of the driven member 3 in those divided areas. As this occurs, a more accurate traveling control of the driven member 3 can be realized.

Thus, as has been described heretofore, according to the driving apparatus according to the embodiment, by dividing the whole traveling area of the driven member 3 into the plurality of divided areas and supplying the different drive signals to the piezoelectric element 1 in those divided areas so as to implement the drive control, even in the event that the traveling speed of the driven member 3 differs depending upon the position thereof relative to the drive shaft 2 when the drive shaft 2 is driven by the same drive signal, the change in the traveling speed of the driven member 3 can be suppressed. Because of this, the traveling control of the driven member 3 is eased.

Figure 10A:
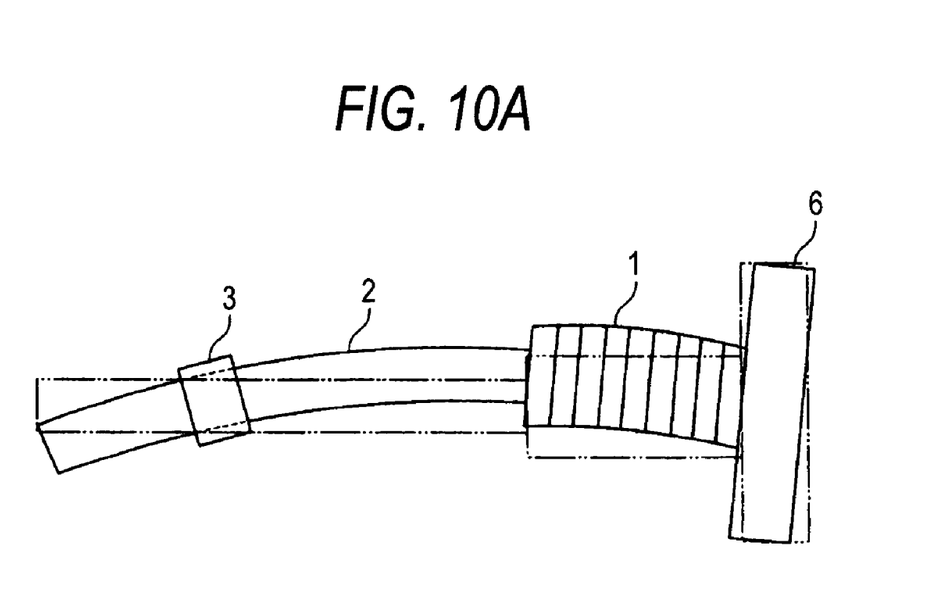
FIG. 10 is an explanatory diagram which explains the resonance in the related art.
Figure 10B:
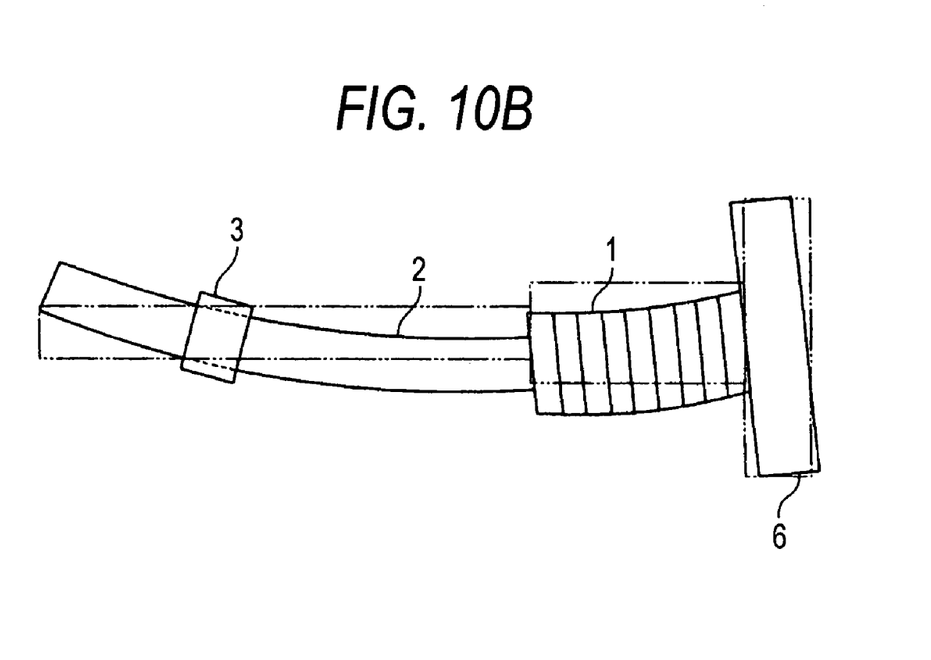

For example, when vibrations resonate due to extension and contraction of the piezoelectric element 1, the degree of influence by the resonance differs depending upon the position of the driven member 3 relative to the drive shaft 2. In addition, as is shown in FIGS. 10(A), (B), the piezoelectric element 1 is displaced in other directions than the direction in which it extends and contracts. Because of this, when the drive shaft 2 is driven by a constant drive signal, the traveling speed of the driven member 3 does not become constant depending upon the position of the driven member 3 relative to the drive shaft 2. In contrast to this, with the driving apparatus according to the embodiment, by implementing the drive control by supplying different drive signals in the divided areas, the change in the traveling speed of the driven member 3 can be suppressed, thereby making it possible to stabilize the traveling speed thereof.

In addition, by making the traveling speed of the driving member 3 constant in this way, the traveling distance (feeding distance) per unit time becomes constant. Because of this, by setting a driving time properly, it becomes possible to send the driven member 3 to a desired position. Consequently, a complex feedback control and convergent driving are made unnecessary, whereby the control can be made simple.

In addition, with the driving apparatus according to the embodiment, the drive signal is supplied to the piezoelectric element 1 so that the driving speed of the drive shaft 2 becomes larger in the position lying on the end portion side than in the position lying on the central side of the drive shaft 2. Because of this, in the event that the traveling speed of the driven member 3 becomes slow in the position lying on the end portion side of the drive shaft 2 when the same drive signal is supplied to the piezoelectric signal 1, the change in the traveling speed of the driven member 3 can be suppressed. For example, this becomes effective when the traveling speed of the driven member 3 becomes slow because of the resonance of vibrations occurring by virtue of extension and contraction of the piezoelectric element 1.

Additionally, with to the driving apparatus according to the embodiment, by controlling the driving speed of the drive shaft 2 by supplying the different drive signals according to the traveling directions of the driven member 3, even in the event that the traveling speed of the driven member 3 is changed depending upon the traveling directions thereof when the drive shaft 2 is driven by the same drive signal, the change in the traveling speed of the driven member 3 can be suppressed. Because of this, the traveling control of the driven member 3 becomes easy.

Furthermore, with the driving apparatus according to the embodiment, the drive signal is supplied to the piezoelectric element 1 so that the driving speed of the drive shaft 2 is increased to become faster when the driven member 3 is caused to travel in the direction in which the traveling load is increased than when the driven member 3 is caused to travel in the direction in which the traveling load is decreased. Because of this, even in the event that the traveling speed of the driven member 3 in the direction in which the traveling speed is increased is decreased when the same drive signal is supplied to the piezoelectric element 1, the change in the traveling speed of the driven member 3 can be suppressed.

In addition, by applying the driving apparatus according to the embodiment to an actuator for a constituent part of a photographic optical system of a camera, a driving mechanism can be constructed small, thereby making it possible to realize the reduction in size of the camera. In addition, by applying the driving apparatus of the embodiment to an actuator for a constituent part of a photographic optical system of a camera of a mobile phone, a driving mechanism can be constructed small, thereby making it possible to realize the reduction in size of the mobile phone. In addition to these applications, the driving apparatus can be applied to an actuator of a web camera and the like.

Note that the embodiment that has been described heretofore is such as to shown the example of the driving apparatus according to the invention. The driving apparatus according to the invention is not limited to the driving apparatus according to the embodiment, and hence, the driving apparatus according to the embodiment may be modified or applied to other applications without departing from the spirit and scope of the claims of the invention.

For example, while in the embodiment, the invention is described as being applied to the driving apparatus for driving the movable lens, the invention may be applied to a driving apparatus for driving other things than the movable lens.

In addition, while in the embodiment, the case is described in which the piezoelectric element 1 is attached to the stationary frame 4 via the support member 5 so as to make the end portion of the piezoelectric element 1 the free end, a configuration may be adopted in which the end portion of the piezoelectric element 1 is attached directly to the stationary frame 4.

Additionally, while in the embodiment, the case is described in which the traveling area of the driven member 3 is divided into three portions of a distal side end portion, a central portion and a proximal side end portion so as to implement the traveling control thereof by the different drive signals, a case may be adopted in which the traveling control of the driven member 3 may be implemented by different drive signals by dividing the traveling area of the driven member 3 into two or four or more portions.

According to the invention, the change in traveling speed of the driven member can be suppressed by supplying different drive signals to the electro-mechanical conversion element according to the position of the driven member relative to the driving member or the traveling direction of the driven member.

The entire disclosure of each and every foreign patent application from which the benefit of foreign priority has been claimed in the present application is incorporated herein by reference, as if fully set forth.

What is claimed is:

1. A driving apparatus comprising:

an electro-mechanical conversion element;

a driving member that drives backwards and forwards in a straight line in response to extension and contraction of the electro-mechanical conversion element which are brought about by a drive signal being supplied thereto;

a driven member, frictionally engaged with the driving member, that moves backwards and forwards in a straight line along the driving member by driving the driving member; and a drive control unit that divides a whole traveling area of one or both of an outgoing traveling path and an incoming traveling path of the driven member into a plurality of divided areas and supplies different drive signals to the divided areas so as to implement a drive control.

2. A driving apparatus as set forth in claim 1, wherein the drive control unit supplies the drive signal to the electro-mechanical conversion element so that a driving speed of the driving member becomes larger in a position lying at an end portion side than a position lying on a center side of the driving member.

3. A driving apparatus as set forth in claim 1, wherein the different drive signals are such that their signal frequencies are changed.

4. A driving apparatus as set forth in claim 1, wherein the different drive signals are such that their waveforms are changed.

5. A driving apparatus comprising:

an electro-mechanical conversion element;

a driving member that drives backwards and forwards in a straight line in response to extension and contraction of the electro-mechanical conversion element which are brought about by a drive signal being supplied thereto;

a driven member, frictionally engaged with the driving member, that moves backwards and forwards in a straight line along the driving member by driving the driving member; and a drive control unit that controls a driving speed of the driving member by supplying different drive signals according to traveling directions of the driven member where each different drive signal causes a different driving speed of the driving member.

6. A driving apparatus as set forth in claim 5, wherein the drive control unit supplies a drive signal to the electro-mechanical conversion element so that the driving speed of the driving member becomes larger when moving the driven member in a direction in which a traveling load of the driven member is increased than when moving the driven member in a direction in which the traveling load of the driven member is decreased.

7. A driving apparatus as set forth in claim 5, wherein the different drive signals are such that their signal frequencies are changed.

8. A driving apparatus as set forth in claim 5, wherein the different drive signals are such that their waveforms are changed.

\* \* \* \* \*